United States Patent [19]
Fujio

[11] 4,144,631
[45] Mar. 20, 1979

[54] METHOD AND APPARATUS FOR FITTING HEAT SHRINKABLE FILM SEALS TO NECKS OF VESSELS

[76] Inventor: Masaaki Fujio, 3-15-18 Aoyamadai, Suita, Japan

[21] Appl. No.: 834,984

[22] Filed: Sep. 20, 1977

[30] Foreign Application Priority Data

Sep. 17, 1976 [JP] Japan .................................. 51-110866

[51] Int. Cl.² .............................................. B29C 27/30
[52] U.S. Cl. ........................................ 29/446; 29/235; 156/86
[58] Field of Search ................. 29/446, 447, 448, 468, 29/235, 759, 449; 113/1 P, 116 QA, 116 Z, 120 R, 120 A; 156/86, 230, DIG. 8, DIG. 9, DIG. 12, DIG, 14

[56] References Cited

U.S. PATENT DOCUMENTS

| 1,884,643 | 10/1932 | Forbes | 29/235 |
| 3,605,239 | 9/1971 | Eschholz | 29/235 |
| 4,011,122 | 3/1977 | Ashcroft | 156/86 |
| 4,016,704 | 4/1977 | Fujio | 156/86 |
| 4,048,281 | 9/1977 | Brummett et al. | 156/86 |

Primary Examiner—Michael J. Keenan
Attorney, Agent, or Firm—Cantor and Singer

[57] ABSTRACT

A heat shrinkable film is opened up from a collapsed state by suckers and is stretched over several guide members which are then clamped over the neck of a vessel. The film is pushed off the guide members onto the neck of the vessel and is clamped there by clamp members while the guides are withdrawn.

12 Claims, 7 Drawing Figures

METHOD AND APPARATUS FOR FITTING HEAT SHRINKABLE FILM SEALS TO NECKS OF VESSELS

BACKGROUND OF THE INVENTION

The present invention relates to a method for putting on tubes of heat shrinkable film over the necks of sealed vessels automatically, and to a device for performing the method.

It has been difficult to apply tubes of heat shrinkable film to necks of sealed vessels using prior art methods and apparatus. The tubes of film often were in a collapsed form, or at least not perfectly cylindrical, which meant that for practical fitting it was necessary for the diameter of the tubes to be considerably larger than the diameter of the necks of the vessels, because exact positioning was difficult. Accordingly, in the prior art only tubes of large heat shrinkage coefficient materials were suitable for use as sealing films.

SUMMARY OF THE INVENTION

It is an object of the present invention to provide a method for putting heat shrinkable films automatically and efficiently over the necks of vessels.

Another object of the present invention is to provide a method for putting heat shrinkable films onto the necks of vessels which can be applied to various shapes and sizes of neck without any modification to the apparatus used.

Another object of the present invention is to provide apparatus for performing the aforesaid methods.

Other objects and features of the present invention will become apparent from the following specification.

According to the present invention, this object is accomplished by providing guides for the tube of film, the guides having a mutual configuration which defines a substantially tubular inside space and a substantially tubular outside surface and being movable substantially radially with respect to one another so as to widen or narrow the inside space and the outside surface. The guides are inserted into the tube of film, which may optionally be first opened out by a plurality of suckers, and then the guides are moved out from one another so as to stretch the film over their outside surfaces and to open it out as far as possible. Then the neck of the vessel is inserted between the ends of the guides and they are brought somewhat together so as to grip it between them. In this way the tube of film is somewhat relaxed so that it is no longer stretched tightly over the guides. Then a push member pushes the tube of film along the guides and over the neck of the vessel. Optionally, then, clamp members clamp the film to the neck of the vessel and the force bringing the guides together is relaxed so that they release the neck of the vessel and may be withdrawn from it. They then are withdrawn from the neck of the vessel, leaving the tube of film on it, ready to be heat treated in an oven so as to shrink it tightly onto the neck.

BRIEF DESCRIPTION OF THE DRAWINGS

The present invention will become more clearly understood when the following account of the preferred embodiment is read in conjunction with the appended drawings, which however are not limitative of the present invention, and wherein.

DESCRIPTION OF THE PREFERRED EMBODIMENT

Figure 1:
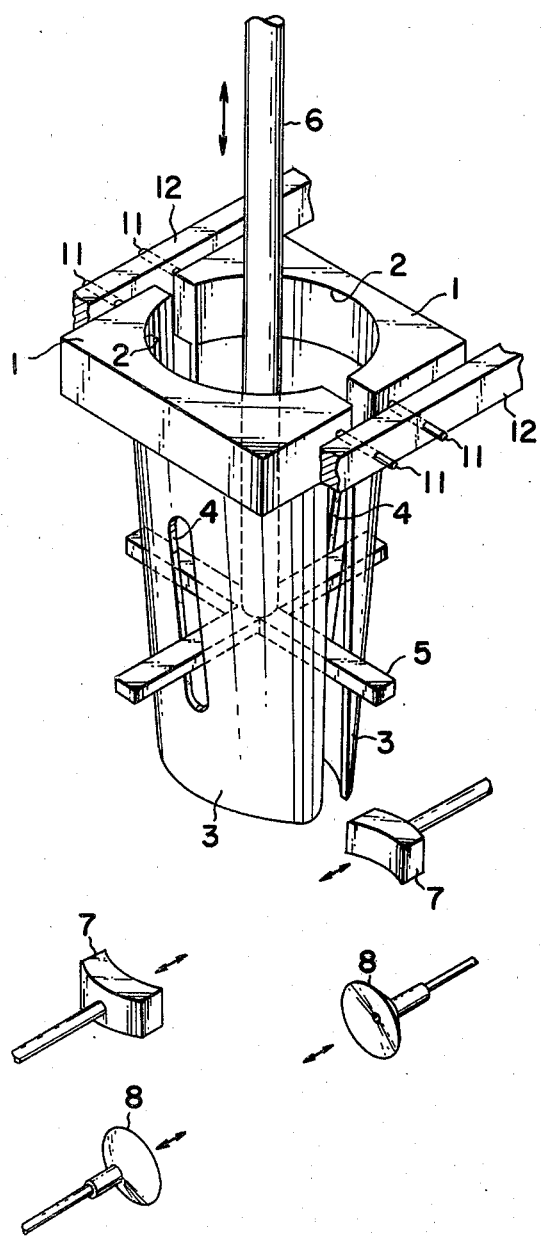
FIG. 1 is a schematic perspective view of the device of the present invention.
Figure 2:
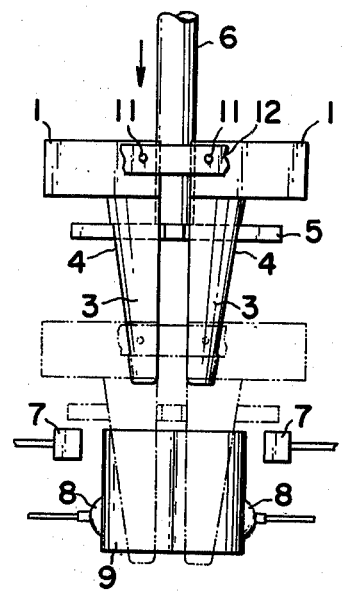
FIG. 2 is a side view showing a tube of the heat shrinkable film held open by the sucker members just before the guide members are inserted into it.
Figure 3:
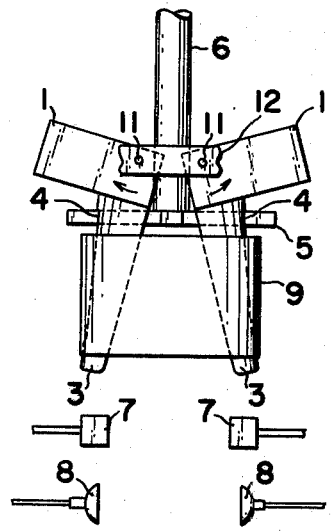
FIG. 3 is a side view showing the tube being held open by the guide members which are moved apart so as to stretch it across their outside surfaces.

Turning now to the drawings, 1 designates the base of two guide elements which are adapted to hinge around hinges 11 so that their lower end portions 3 can be made to approach or to recede from one another. The lower portions 3 of the guide element have substantially smooth outer surfaces so that a tube of heat shrinkable film 9 may easily slide along them. Further they have a pair of operative ends which are adapted to grip from the outside the neck 10 of a vessel which is to be sealed. Each guide 3 is further provided with a slit 4 extending in its longitudinal direction and a cross-shaped push element 5 is provided so as to be pushed downward by a pushing rod 6, with two of the arms of the cross disposed in between the guide elements 3 and two of the arms of the cross projecting through the slits 4 in the guides. The hinges 11 are mounted to mounting members 12 fixed to the base of the machine. Further there are provided two sucker elements 8 and two clamping elements 7.

Figure 4:
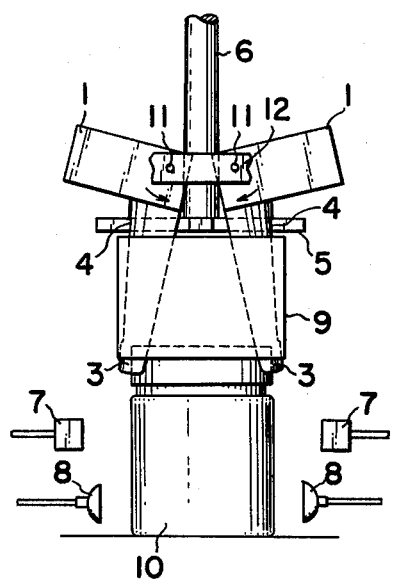
FIG. 4 is a side view of the guide members gripping the upper edge of the vessel neck between their free, or "operative", ends.
Figure 5:
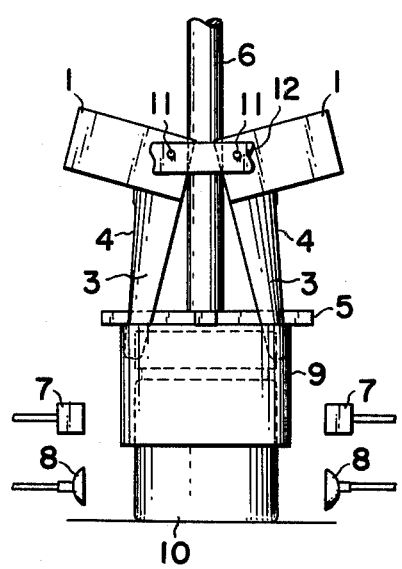
FIG. 5 is a side view of the film when it has been pushed along the guide members and over the neck of the vessel by the push member.
Figure 6:
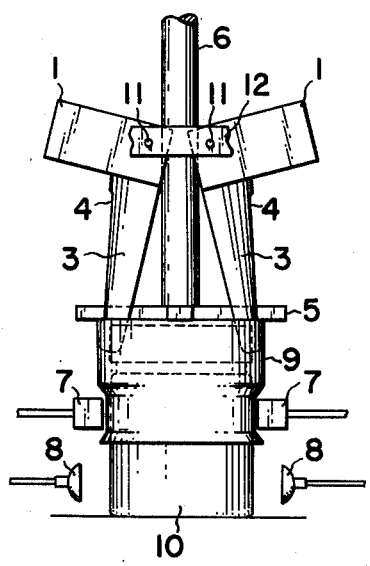
FIG. 6 is a side view showing the clamp means clamping the vessel neck through the heat shrinkable film.
Figure 7:
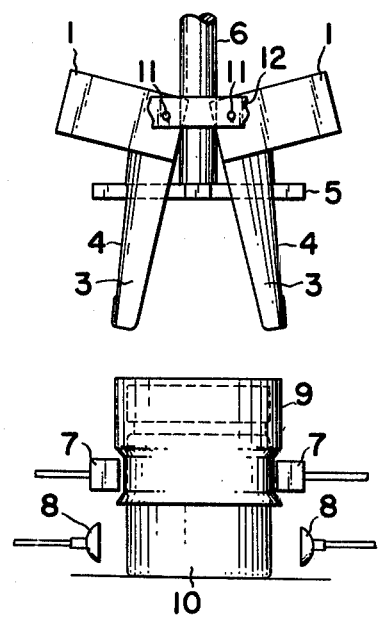
FIG. 7 is a side view showing the guide members being removed from the vessel neck.

The device shown in the illustrations operates as follows. First a film tube magazine (not shown) feeds a piece of film in collapsed form between the two suckers 8. They are brought in to grip it and then are withdrawn outwards so as to open it out. Then the sucker members are brought in a direction upwards in the figures so that the piece of tube which they are holding is placed over the guides 3. Then the guides 3 are opened out to their fullest extent possible by hinging then outwards around the hinges 11, so as to stretch the film tightly around their outside surfaces. The sucker elements 8 are then withdrawn. Then the neck of the vessel is approached to the lower operative portions of the guides 3. Then the elements 3 are brought together as much as possible so that their operative ends grip the neck of the vessel and so that the film is somewhat relaxed from its tight stretching over the outside surfaces of the elements 3 so that it can slide thereover. This is shown in FIG. 4. Then, as shown in FIG. 5, the push element 5 is impelled downward by the pushing rod 6 so that it pushes off the film 9 onto the neck of the vessel. Then as shown in FIG. 6 the clamp elements 7 are moved inwards so as to grip the neck of the vessel through the film, thus clamping it to the neck of the vessel positively. Then the inward pressure of the elements 3 is relaxed and, as shown in FIG. 7, they are removed from the neck of the vessel., leaving the film clamped thereon by the clamping elements 7, ready for heat sealing treatment.

As can be readily conceived, this process can be performed quickly and repeatedly using this apparatus. Furthermore, the same apparatus can be used for a plurality of different sizes and shapes of vessel neck, which is a great advantage of this invention.

It should be understood that the above description relates only to one possible embodiment of the present invention, which is therefore not to be limited to the particualar embodiment shown. For example, the membbers 3 could be provided to be more than two in number, and the way in which they are brought towards one another and brought apart from one another need not be necessarily limited to hinging around their upper portions, but could be provided in many different ways. Further the provision of the sucker elements 8 and the clamp elements 7 is optional. Further the means for pushing off the tube from the guides onto the neck of the bottle could be provided in many different ways, which, however, all are to be understood as being according to the present invention. It is to be understood, therefore, that various changes and modifications of the form and detail of the present invention may be made therein without departing from its spirit.

I claim:

1. A method for putting a tube of heat shrinkable film on over the neck of a vessel, comprising:
    (a) inserting the operative ends of a plurality of guides into the tube of film, the guides having a mutual configuration which defines a substantially tubular inside space and a substantially tubular outside surface and being movable substantially radially with respect to one another so as to widen or narrow the inside space and the outside surface;
    (b) spreading out the film tube by moving the guides apart so as to widen the outside surface defined by them;
    (c) inserting the neck of the vessel into the inside space defined between the guides past their operative ends;
    (d) slightly bringing together the guides so as to grip the neck of the vessel between their operative ends;
    (e) pushing the tube of film along the guides and over the neck of the vessel; and
    (f) releasing the grip of the operative ends of the guides on the neck of the vessel and removing them from it, leaving the tube of film on the neck.

2. A method as in claim 1, further comprising opening up the film tube with a plurality of sucker elements so as to facilitate the insertion performed in step (a).

3. A method as in claim 1, further comprising clamping the tube of film to the neck of the vessel by a plurality of clamping means so as positively to hold the film onto the neck of the vessel during step (f).

4. A method as in claim 1, wherein the guides are two in number.

5. A method as in claim 4, wherein the guides are moved substantially radially so as to widen and narrow the space between them by being pivoted around substantially axial axes at the other longitudinal ends of the guides from their operative ends.

6. Apparatus for putting a tube of heat shrinkable film on over the neck of a vessel, comprising
    a plurality of guides which have a mutual configuration which defines a substantially tubular inside space and a substantially tubular outside surface,
    and which are movable substantially radially with respect to one another so as to widen or narrow the inside space and the outside surface,
    and which have free operative ends adapted for gripping the neck of a vessel between them,
    and which have an outer surface adapted for guiding the tube of film over the guides onto the neck of the vessel.

7. Apparatus as in claim 6, further comprising a plurality of sucker elements which open up the tube of film prior to the guide elements being inserted into it.

8. Apparatus as in claim 6, further comprising clamping means which clamp the tube of film to the neck of the vessel when it has been placed thereover.

9. An apparatus as in claim 6, wherein the guides are two in number.

10. Apparatus as in claim 9, wherein the guides are moved substantially radially so as to widen and narrow the space between them by being pivoted around substantially axial axes at the other longitudinal ends of the guides from their operative ends.

11. Apparatus as in claim 6, further comprising a pushing element for pushing the tube of film off the guides onto the neck of the vessel.

12. Apparatus as in claim 11, wherein the pushing element is of the form of a multi-armed cross whereof at least some of the arms project through longitudinal slots formed in the guides.

* * * * *